United States Patent
Ardigo

(10) Patent No.: US 9,016,748 B1
(45) Date of Patent: Apr. 28, 2015

(54) INTERIOR DOOR PANELS WITH STORAGE COMPARTMENT ARRANGEMENTS

(71) Applicant: Frank Ardigo, St. Clair, MI (US)

(72) Inventor: Frank Ardigo, St. Clair, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/225,065

(22) Filed: Mar. 25, 2014

(51) Int. Cl.
*B60R 7/04* (2006.01)
(52) U.S. Cl.
CPC ..................................... *B60R 7/046* (2013.01)
(58) Field of Classification Search
CPC .............. B60J 5/04; E06B 7/00; B60R 7/046
USPC ........ 296/37.8, 37.12, 37.13, 24.34; 312/292, 312/295, 321.5; 49/502, 70; 109/54
See application file for complete search history.

(56) References Cited

U.S. PATENT DOCUMENTS

| | | | | | |
|---|---|---|---|---|---|
| 1,694,855 | A | * | 12/1928 | Irons | 296/37.13 |
| 2,798,445 | A | * | 7/1957 | Gehman | 109/50 |
| 3,717,112 | A | * | 2/1973 | Welty | 109/23 |
| 5,795,005 | A | * | 8/1998 | Garfias et al. | 296/37.5 |
| 5,800,004 | A | * | 9/1998 | Ackeret | 296/37.13 |
| 6,682,115 | B1 | * | 1/2004 | Tiesler | 296/37.1 |
| 7,086,689 | B2 | * | 8/2006 | Dean | 296/182.1 |
| 8,398,139 | B2 | * | 3/2013 | Blackmore et al. | 296/37.12 |
| 8,444,198 | B2 | | 5/2013 | Pauken | |
| 2005/0018392 | A1 | * | 1/2005 | Strohmeier et al. | 361/683 |
| 2007/0120380 | A1 | * | 5/2007 | Bella | 292/300 |
| 2010/0156131 | A1 | * | 6/2010 | D'Alessandro et al. | 296/37.8 |
| 2012/0061983 | A1 | | 3/2012 | Seiller et al. | |
| 2013/0043698 | A1 | * | 2/2013 | Blackmore et al. | 296/37.12 |
| 2013/0057011 | A1 | * | 3/2013 | Yamagishi et al. | 296/24.34 |
| 2013/0248572 | A1 | | 9/2013 | Myers | |

FOREIGN PATENT DOCUMENTS

CN 103158628 A 6/2013
JP H10181454 A 7/1998

* cited by examiner

*Primary Examiner* — Jason S Morrow
(74) *Attorney, Agent, or Firm* — Ingrassia Fisher & Lorenz, P.C.

(57) ABSTRACT

Interior door panel arrangements for motor vehicles are provided herein. In one example, an interior door panel arrangement comprises a door panel wall surrounding an interior volume and defines a door panel with an opening formed through the door panel wall. A storage compartment arrangement is operably coupled to the door panel wall and comprises a storage compartment bin that is configured to be advanced through the opening between a retracted position in the interior volume and an extended position outside of the interior volume.

15 Claims, 4 Drawing Sheets

INTERIOR DOOR PANELS WITH STORAGE COMPARTMENT ARRANGEMENTS

TECHNICAL FIELD

The technical field relates generally to interior door panels for motor vehicles, and more particularly to interior door panels, such as glove box doors or the like, with storage compartment arrangements that include a storage compartment bin that can be hidden in the interior door panel in a retracted position and that can be accessible outside of the interior door panel to a driver or other occupant of a motor vehicles when advanced to an extended position.

BACKGROUND

Providing adequate and practical storage space for drivers and other occupants of motor vehicles has traditionally been a priority for automobile manufacturers. In the vehicle interior, various storage compartments are often provided with a door panel that extends across the storage compartment in a closed position to cover the storage compartment and that can be opened to expose the storage compartment making it accessible to the driver or other vehicle occupants. For example, glove box storage compartments typically include a glove box door that can be closed to cover the glove box storage compartment and securely store and hide any contents contained therein and that can be opened to allow access to the storage compartment.

In one glove box device described in CN103158628, the device includes a smaller storage compartment ("ditty box") within the larger storage compartment of the glove box. When the glove box door is opened, a driver or other occupant of the motor vehicle can open a separate door to the ditty box to access the smaller storage compartment. Unfortunately, the smaller storage compartment of the ditty box is directly above the larger storage compartment of the glove box such that any contents in the ditty box can easily fall into the larger storage compartment of the glove box and become covered by or lost within the additional contents of the larger storage compartment, making the ditty box contents more difficult to retrieve. Additionally, opening the ditty box door and accessing the contents therein requires the driver to reach substantially across the interior of the motor vehicle into the glove box compartment on the passenger side, which can be inconvenient and/or distracting.

Accordingly, it is desirable to provide an interior vehicle storage compartment that is readily accessible to a driver or other occupants of a motor vehicle and provides improved organization for containing various items. Additionally, it is desirable to provide an interior vehicle storage compartment that helps keep its contents securely stored and hidden by an interior door panel. Furthermore, other desirable features and characteristics of the present invention will become apparent from the subsequent detailed description and the appended claims, taken in conjunction with the accompanying drawings and this background.

BRIEF SUMMARY

Interior door panel arrangements for motor vehicles are provided herein. In accordance with an exemplary embodiment, an interior door panel arrangement for a motor vehicle includes, but is not limited to, a door panel wall that surrounds an interior volume. The door panel wall defines a door panel with an opening formed through the door panel wall. A storage compartment arrangement is operably coupled to the door panel wall and comprises a storage compartment bin that is configured to be advanced through the opening between a retracted position in the interior volume and an extended position outside of the interior volume.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to interior door panels with storage compartment arrangements for motor vehicles. The exemplary embodiments taught herein provide a door panel wall that surrounds an interior volume. The door panel wall defines a door panel with an opening formed through the door panel wall open to the interior volume. A storage compartment arrangement is operably coupled to the door panel wall and comprises a storage compartment bin. The storage compartment bin is configured to be advanced through the opening between a retracted position in the interior volume and an extended position outside of the interior volume. Advantageously, in an exemplary embodiment, any contents in the storage compartment bin are securely stored and hidden by the door panel when the storage compartment bin is in the retracted position. Additionally, any contents in the storage compartment bin are readily accessible to a driver or other occupant of the motor vehicle when the storage compartment bin is in the extended position.

Figure 1:
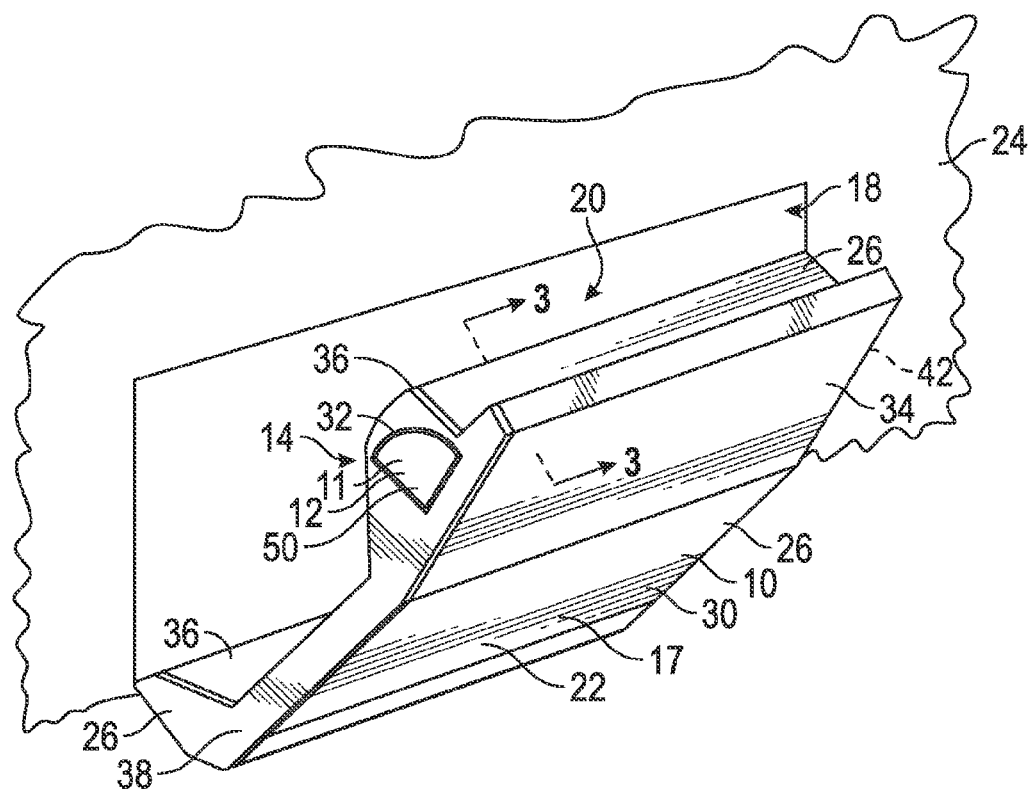
FIG. 1 is a perspective view illustrating an interior door panel with a storage compartment bin in a retracted position in accordance with an exemplary embodiment.
Figure 2:
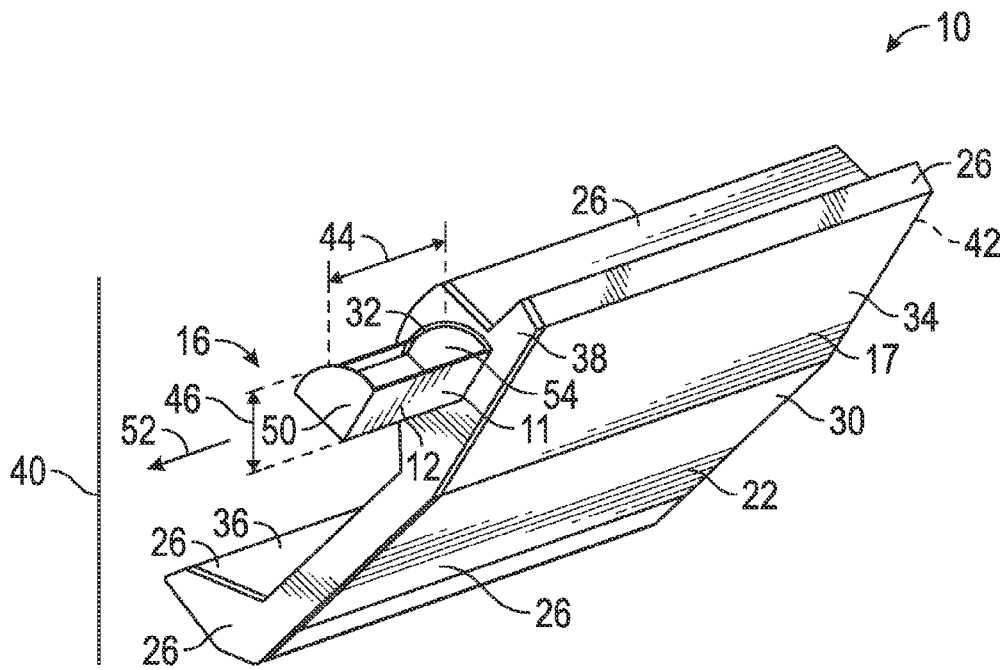
FIG. 2 is a perspective view illustrating an interior door panel with a storage compartment bin in an extended position in accordance with an exemplary embodiment.
Figure 3:
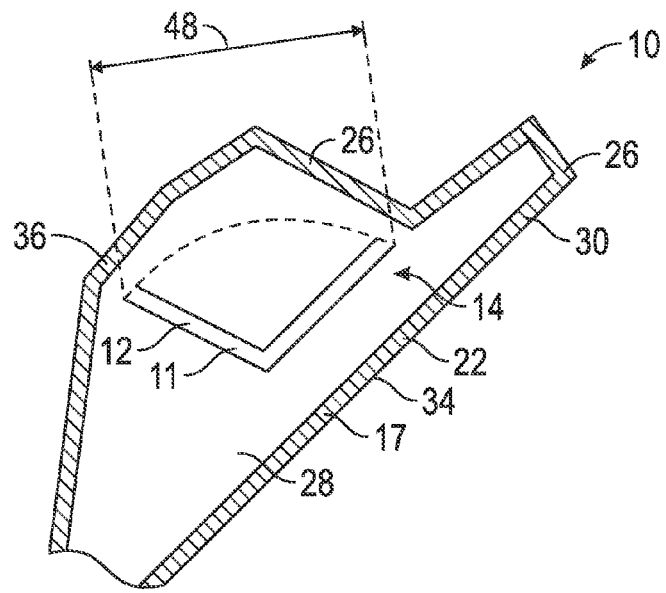
FIG. 3 is a sectional view illustrating a portion of the interior door panel depicted in FIG. 1.

FIG. 1 is a perspective view of an interior door panel 10 with a storage compartment arrangement 11 that includes a storage compartment bin 12 in a retracted position 14, FIG. 2 is a perspective view of the interior door panel 10 with the storage compartment bin 12 in an extended position 16, and FIG. 3 is a sectional view of a portion of the interior door panel 10 depicted in FIG. 1 along line 3-3. In an exemplary embodiment, the interior door panel 10 is a glove box door 17 that is part of a glove box arrangement 18 as is well known in the art. The glove box arrangement 18 includes a glove box storage compartment 20 that is covered by the glove box door 17 when the glove box door 17 is closed (not shown) and that is accessible when the glove box door 17 is opened to an opened position 22. As illustrated, the glove box arrangement 18 forms part of an instrument panel 24. In an exemplary embodiment, the instrument panel 24 is positioned forward of a driver seat and a front passenger seat in an interior of a motor vehicle. As such, FIG. 1 depicts a view of a portion of the instrument panel 24 including the glove box arrangement 18 forward of the front passenger seat.

The interior door panel 10 includes a door panel wall 26 that surrounds an interior volume 28 and that defines a door panel 30 with an opening 32 that extends through the door panel wall 26 open to the interior volume 28. The door panel wall 26 includes an outer wall section 34 that faces towards the interior of the motor vehicle, an outer wall section 36 that faces away from the interior of the motor vehicle generally towards the glove box storage compartment 20, an inboard sidewall section 38 that faces generally towards a driver 40 of the motor vehicle, and an outboard sidewall section 42 that faces generally away from the driver 40.

In an exemplary embodiment and as shown, the opening 32 is formed through the inboard sidewall section 38. Advantageously and as will be discussed in further detail below, having the opening 32 formed in the inboard sidewall section 38 allows the storage compartment bin 12 to be advanced through the opening 32 from the retracted position 14 in the interior volume 28 to the extended position 16 outside of the interior volume 28 to facilitate the driver 40 accessing the storage compartment bin 12 when the glove box door 17 is in the opened position 22 without having to reach substantially across the interior of the motor vehicle into the glove box storage compartment 20.

In an exemplary embodiment and as illustrated, the storage compartment bin 12 has a substantially "V-shape." Advantageously, the "V-shape" of the storage compartment bin 12 helps provide adequate and practical storage space that can be efficiently packaged within the interior volume 28 of the interior door panel 10. In an exemplary embodiment, the storage compartment bin 12 extends outside of the interior volume 28 from the inboard sidewall section 38 a distance (indicated by double headed arrow 44) of from about 25 to about 250 mm when in the extended position 16 to facilitate accessing the storage compartment bin 12 by the driver 40 or other occupants of the motor vehicle. In an exemplary embodiment, the storage compartment bin 12 has a depth (indicated by double headed arrow 46) of from about 15 to about 50 mm and a maximum width (indicated by double headed arrow 48) of from about 25 to about 75 mm to help provide adequate and practical storage space.

As illustrated, when the storage compartment bin 12 is in the retracted position 14, an outer sidewall section 50 of the storage compartment bin 12 is substantially planar with the inboard sidewall section 38 of the door panel 30. Advantageously, this arrangement allows the storage compartment bin 12 to be substantially enclosed and hidden by the door panel wall 26 when in the retracted position 14 while providing an aesthetically pleasing finished panel appearance.

In an exemplary embodiment, the storage compartment bin 12 is configured to be advanced through the opening 32 from the retracted position 14 to the extended position 16 in a direction (indicated by arrow 52) generally towards the driver 40 to advantageously position the storage compartment bin 12 closer to and within easy access to the driver 40. As illustrated, the storage compartment bin 12 has an inner sidewall section 54 that substantially obstructs the opening 32 when in the storage compartment bin 12 is in the extended position 16. Advantageously, this arrangement ensures that the entire storage space defined by the storage compartment bin 12 is outside of the interior volume 28 and is fully accessible to the driver 40 or other occupants of the motor vehicle when the storage compartment bin 12 is in the extended position 16.

Figure 4:
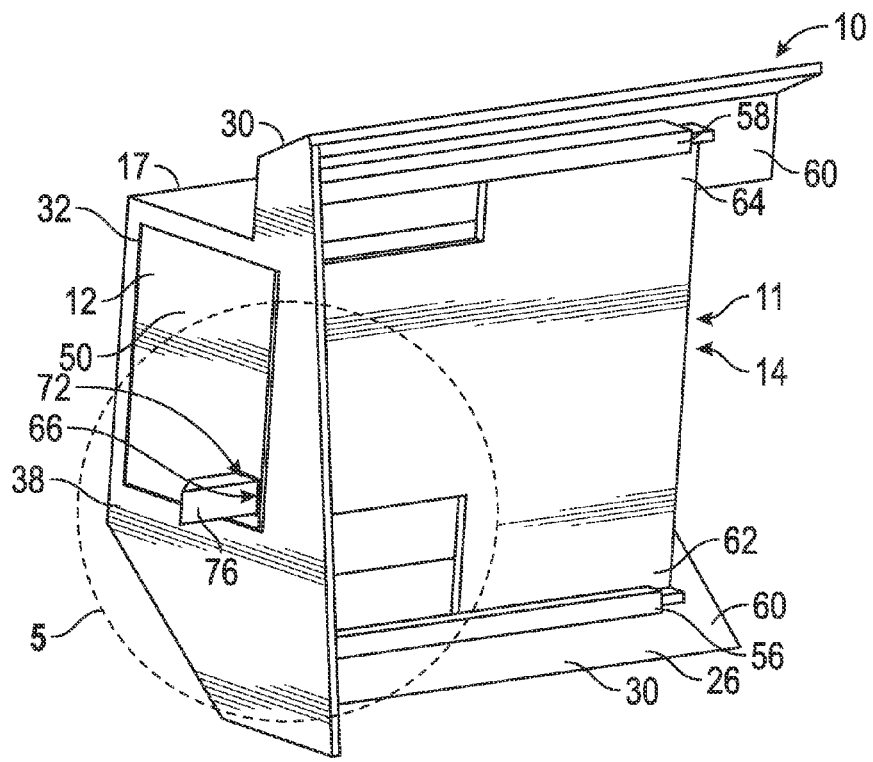
FIG. 4 is a partial tear-away perspective view illustrating a portion of an interior door panel in accordance with an exemplary embodiment.
Figure 5:
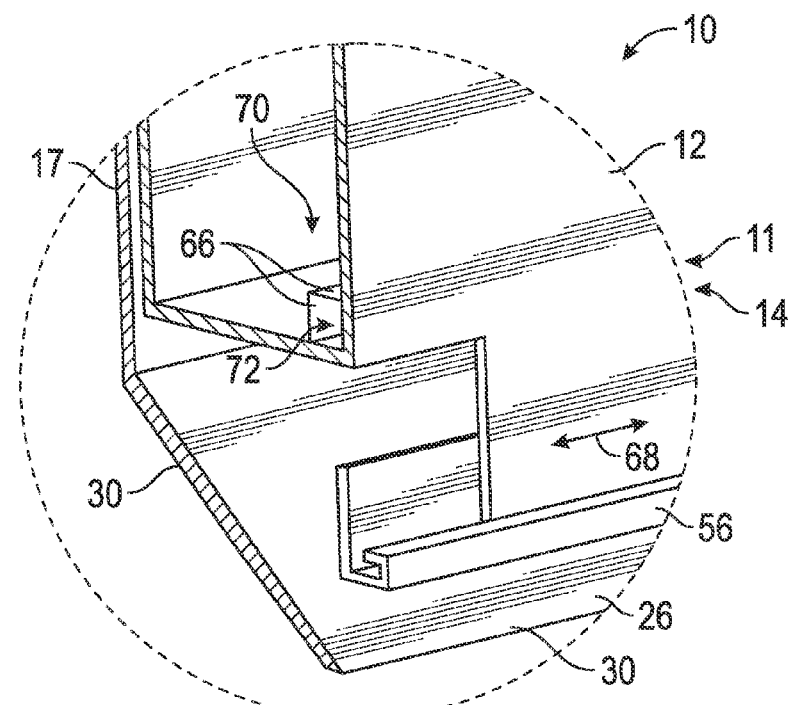
FIG. 5 is a partial tear-away perspective view illustrating a portion of the interior door panel depicted in FIG. 4.
Figure 6:
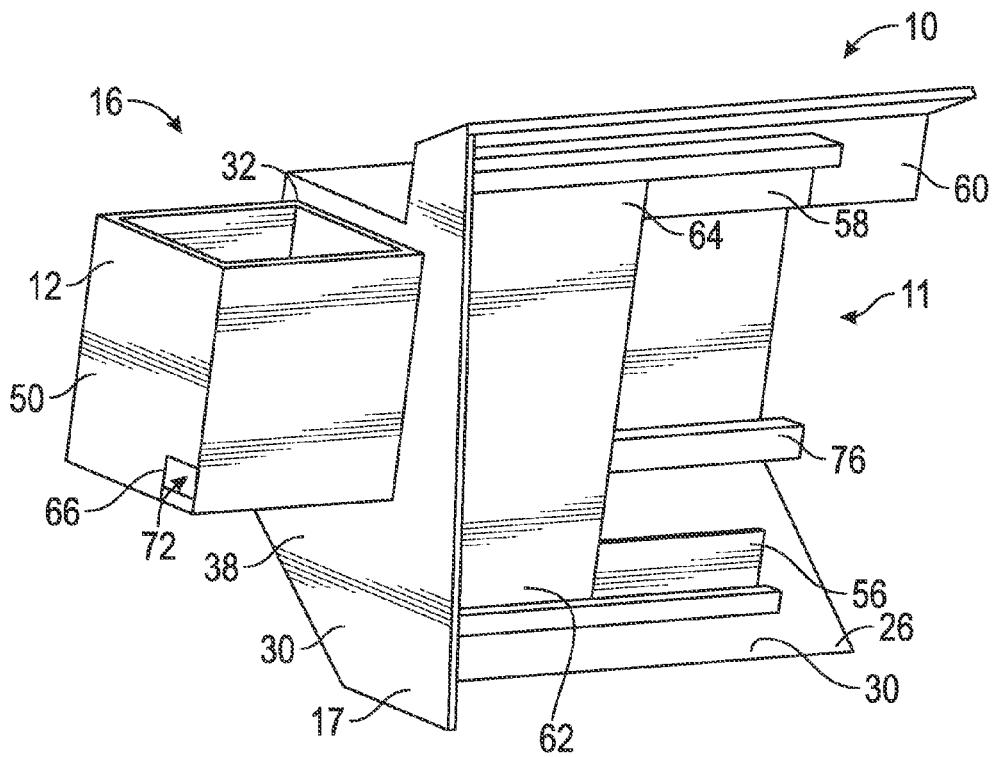
FIG. 6 is a partial tear-away perspective view illustrating a portion of an interior door panel with a storage compartment bin in an extended position in accordance with an exemplary embodiment.

FIG. 4 is a partial tear-away perspective view a portion of the interior door panel 10 with the storage compartment bin 12 in the retracted position 14, FIG. 5 is a partial tear-away perspective view of a portion of the interior door panel 10 depicted in FIG. 4 in area 5, and FIG. 6 is a partial tear-away perspective view of a portion of the interior door panel 10 with the storage compartment bin 12 in the extended position 16 in accordance with an exemplary embodiment. As illustrated in this example, the storage compartment bin 12 has a substantially "box-shape." The "box-shape" of the storage compartment bin 12 advantageously provides enhanced storage space that can be packaged within the interior door panel 10.

The storage compartment arrangement 11 includes lower and upper tracks 56 and 58 that are coupled to an inside surface 60 of the door panel wall 26. The storage compartment bin 12 includes lower and upper wall sections 62 and 64 that slidingly engage the lower and upper tracks 56 and 58, respectively. Advantageously, in an exemplary embodiment, the lower and upper wall sections 62 and 64 slide along the lower and upper tracks 56 and 58, respectively, to facilitate advancing the storage compartment bin 12 between the retracted and extended positions 14 and 16 by stabilizing the storage compartment bin 12 and aligning it with the opening 32 during axial movement.

In an exemplary embodiment, the storage compartment bin 12 has a closed channel 66 that extends in a generally longitudinal direction (indicated by double headed arrow 68) along a lower portion 70 of the storage compartment bin 12. The closed channel 66 has open ends 72 and 74 (see also FIG. 7) and is configured to allow a door latch 76 to advance through the closed channel 66. In an exemplary embodiment, the door latch 76 is for retaining the interior door panel 10 (e.g., glove box door 17) in a closed position to securely cover, for example, the glove box storage compartment 20 (shown in FIG. 1).

Figure 7:
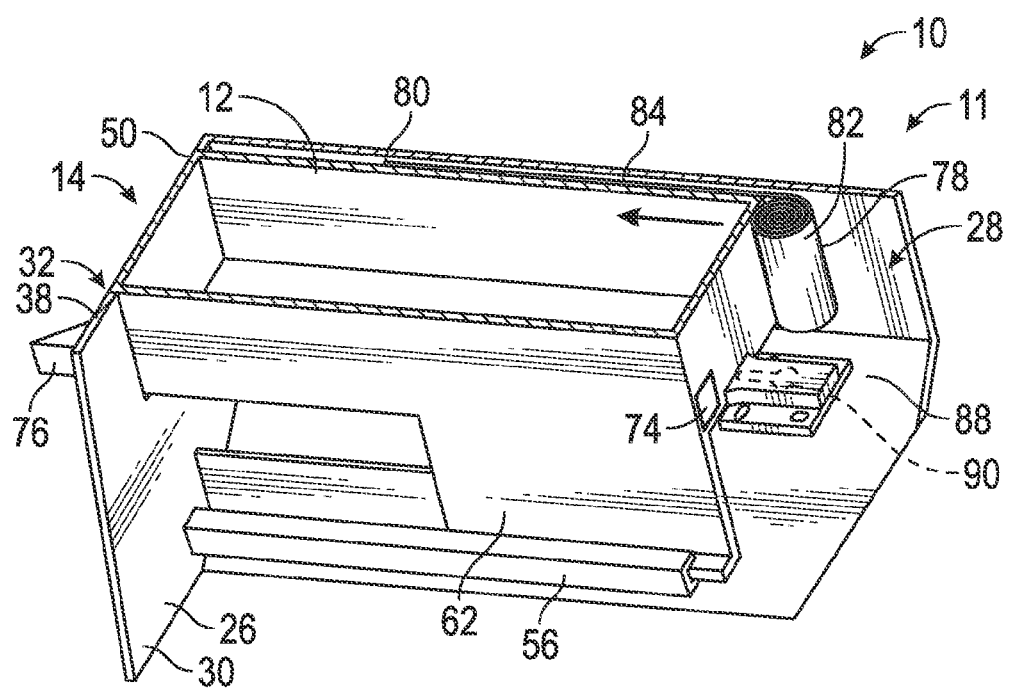
FIG. 7 is a partial tear-away perspective view illustrating a portion of an interior door panel with a storage compartment bin in a retracted position in accordance with an exemplary embodiment.
Figure 8:
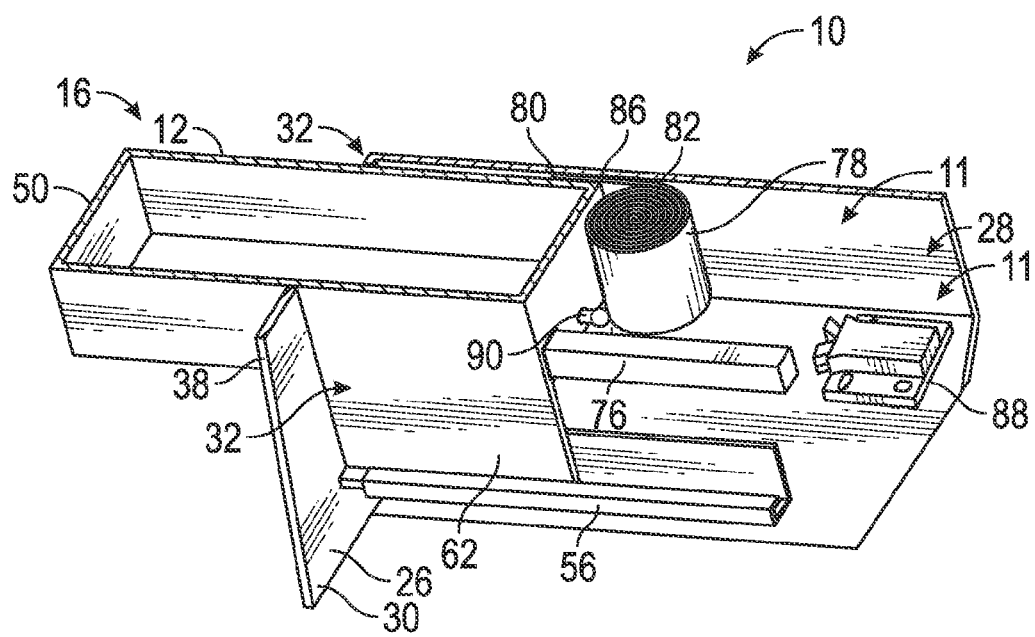
FIG. 8 is a partial tear-away perspective view illustrating a portion of an interior door panel with a storage compartment bin in an extended position in accordance with an exemplary embodiment.

FIGS. 7-8 are partial tear-away perspective views of a portion of the interior door panel 10 with the storage compartment bin 12 in the retracted and extended positions 14 and 16, respectively, in accordance with an exemplary embodiment. The storage compartment arrangement 11 includes a coil spring 78 that is operatively coupled to the door panel wall 26 at an end section 80 of the coil spring 78 and to the storage compartment bin 12 at a coil section 82. As illustrated in FIG. 7, the coil spring 78 is in a substantially extended or tensioned condition 84 to urge the storage compartment bin 12 from the retracted position 14 to the extended position 16. As illustrated in FIG. 8, when the storage compartment bin 12 is in the extended position 16, the coil spring 78 is in a substantially coiled or relaxed condition 86. As such, this allows the storage compartment bin 12 to be initially pushed by an external force (e.g., a push motion provided by the driver 40 shown in FIG. 2 or other occupant of the motor vehicle) with relatively little resistance from the extended position 16 back to the retracted position 14. In an exemplary embodiment, the coil spring 78 acts as a dampener to facilitate advancing the storage compartment bin 12 between the retracted and extended positions 14 smoothly with "fluid-like motion."

In an exemplary embodiment, the storage compartment arrangement 11 also includes a push-push mechanism 88. The push-push mechanism 88 is configured to hold the storage compartment bin 12 in the retracted position 14 when storage compartment bin 12 is pushed by an external force from the extended position 16 to the retracted position 14. In particular, the push-push mechanism 88 captures and retains a positive feature 90 that is coupled or attached to the storage compartment bin 12 to hold the storage compartment bin 12 in the retracted position 14 when the storage compartment bin 12 is pushed to the retracted position 14. In an exemplary embodiment, the push-push mechanism 88 releases the positive feature 90, thereby releasing the storage compartment bin 12 from the retracted position 14, when the storage compartment bin 12 is pushed in a direction towards the push-push mechanism 88. Various push-push mechanisms are known to those skilled in the art may and may be used. In one example, the push-push mechanism 88 includes a push-push latch arrangement as described in U.S. patent application Ser. No. 13/958,051, which is incorporate by reference herein in its entirety.

Accordingly, interior door panels with storage compartment arrangements that include a storage compartment bin that can be hidden in the interior door panel in a retracted position and that can be accessible outside of the interior door panel to a driver or other occupant of a motor vehicle when advanced to an extended position have been described.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An interior door panel arrangement for a motor vehicle comprising:
   a door panel wall surrounding an interior volume and defining a door panel with an opening formed through the door panel wall, wherein the door panel extends in a generally longitudinal direction; and
   a storage compartment arrangement operably coupled to the door panel wall and comprising a storage compartment bin that is configured to be advanced in the generally longitudinal direction through the opening between a retracted position in the interior volume and an extended position outside of the interior volume, wherein the door panel wall has an inboard sidewall section configured to face generally towards a driver of the motor vehicle, and wherein the opening is formed in the inboard sidewall section.

2. The interior door panel arrangement of claim 1, wherein the storage compartment arrangement is configured to urge the storage compartment bin from the retracted position to the extended position.

3. The interior door panel arrangement of claim 1, wherein the storage compartment arrangement is configured to allow the storage compartment bin to be pushed by an external force from the extended position to the retracted position.

4. The interior door panel arrangement of claim 1, wherein the storage compartment arrangement comprises a coil spring that is operably coupled to the door panel wall and the storage compartment bin to urge the storage compartment bin from the retracted position to the extended position.

5. The interior door panel arrangement of claim 4, wherein the coil spring acts as a dampener to facilitate smoothly advancing the storage compartment bin between the retracted and extended positions.

6. The interior door panel arrangement of claim 1, wherein the storage compartment arrangement is configured to advance the storage compartment bin from the retracted position in a direction generally towards the driver to the extended position.

7. The interior door panel arrangement of claim 1, wherein the storage compartment bin has an outer sidewall section that is configured to face generally towards the driver and that is substantially planar with the inboard sidewall section when the storage compartment bin is in the retracted position.

8. An interior door panel arrangement for a motor vehicle comprising:
   a door panel wall surrounding an interior volume and defining a door panel with an opening formed through the door panel wall; and
   a storage compartment arrangement operably coupled to the door panel wall and comprising a storage compartment bin that is configured to be advanced through the opening between a retracted position in the interior volume and an extended position outside of the interior volume, wherein the storage compartment bin has a closed channel that extends in a generally longitudinal direction along a lower portion of the storage compartment bin, and wherein the closed channel has open ends and is configured to allow a door latch to advance through the closed channel.

9. The interior door panel arrangement of claim 1, wherein the storage compartment arrangement comprises a push-push mechanism that is actuated by a first external force acting on the storage compartment bin to hold the storage compartment bin in the retracted position and that is actuated by a second external force acting on the storage compartment bin to release the storage compartment bin from the retracted position.

10. An interior door panel arrangement for a motor vehicle comprising:
    a door panel wall surrounding an interior volume and defining a door panel with an opening formed through the door panel wall; and
    a storage compartment arrangement operably coupled to the door panel wall and comprising a storage compartment bin that is configured to be advanced through the opening between a retracted position in the interior volume and an extended position outside of the interior volume, wherein the storage compartment arrangement further comprises a first track and a second track and the storage compartment bin comprises a first will section and a second wall section that are configured to slide along the first track and the second track, respectively, to facilitate advancing the storage compartment bin between the retracted position and the extended position.

11. The interior door panel arrangement of claim 1, wherein the storage compartment bin extends outside of the interior volume from the door panel wall a distance of from about 25 to about 250 mm when in the extended position.

12. The interior door panel arrangement of claim 1, wherein the storage compartment bin has an inner sidewall section that substantially obstructs the opening when in the extended position.

13. The interior door panel arrangement of claim 1, wherein the storage compartment bin has a depth of from about 15 to about 50 mm.

14. The interior door panel arrangement of claim 1, wherein the storage compartment bin has a maximum width of from about 25 to about 75 mm.

15. The interior door panel arrangement of claim 1, wherein the interior door panel arrangement comprises a glove box door.

\* \* \* \* \*